US005236726A

United States Patent [19]

Lancaster

[11] Patent Number: 5,236,726

[45] Date of Patent: Aug. 17, 1993

[54] METHOD OF PROCESSING CELLULOSE SAUSAGE SKINS

[75] Inventor: E. Peter Lancaster, Gig Harbor, Wash.

[73] Assignee: Weyerhaeuser Company, Tacoma, Wash.

[21] Appl. No.: 824,932

[22] Filed: Jan. 24, 1992

Related U.S. Application Data

[63] Continuation-in-part of Ser. No. 804,241, Dec. 5, 1991.

[51] Int. Cl.[5] .................... A21D 13/00; A22C 13/00; B29D 22/00; B29D 23/00

[52] U.S. Cl. .................................. 426/135; 426/138; 106/164; 106/165; 106/167; 106/203; 523/100; 523/300; 536/57; 536/124; 536/127; 428/34.8; 428/35.6

[58] Field of Search .............................. 426/135, 138; 106/163.1, 164, 165, 167, 168, 203; 523/100, 300; 536/56, 57, 124, 127, 128; 428/34.8, 35.6

[56] References Cited

U.S. PATENT DOCUMENTS

| | | | |
|---|---|---|---|
| 3,388,119 | 6/1968 | Cruz | 536/56 |
| 3,533,567 | 10/1970 | Willems | 241/163 |
| 3,758,458 | 9/1973 | Dyer | 536/57 |
| 4,060,684 | 11/1977 | Monk | 536/57 |
| 4,098,996 | 7/1978 | Ryan et al. | 536/57 |
| 4,145,533 | 3/1979 | Farrall | 536/57 |
| 4,466,464 | 8/1984 | Kupcíkevicius et al. | 426/105 |
| 4,466,465 | 8/1984 | Frey | 426/105 |
| 4,466,466 | 8/1984 | Raudys | 426/105 |
| 4,634,470 | 1/1987 | Kamide et al. | 536/56 |
| 4,641,687 | 2/1987 | Kupcíkevicius | 426/105 |
| 4,784,186 | 11/1988 | Stenger et al. | 536/57 |

FOREIGN PATENT DOCUMENTS

| | | | |
|---|---|---|---|
| 1167345 | 7/1989 | Japan | 536/57 |

OTHER PUBLICATIONS

El-Kafrawy, et al., "The Dissolution of Cellulose in Anhydrous Chloral/Aprotic Solvents," *J. of App. Polymer Sci.*, 27:2445–2456 (1982).

Grinberg et al., "Hydrodynamic Machines for the Beating of Pulp Stock," *Bumazhnaya Promyshlennost*, 12:6–7 (1970) (abstract).

Shreve and Brink, "Cellulosic Fibers and Films," *Chemical Process Industries*, 4th ed., McGraw-Hill, pp. 618–623 (1977).

Turai et al., "Application of Ultrasonics in Waste Paper Deinking," Empire State Paper Research Institute, Research Report No. 67, pp. 73–88 (Oct. 1, 1977).

Turai et al., "Pilot Plant Studies of Ultrasonic Deinking," Empire State Paper Research Institute, Research Report No. 69, pp. 161–173 (Oct. 1, 1978).

Turai et al., "Ultrasonic Deinking of Wastepaper, A Pilot-Plant Study," *Tappi*, vol. 62, No. 1, pp. 45–47 (Jan. 1979).

Sobue et al., "The Cellulose-Sodium Hydroxide-Water System as a Function of the Temperature," *Z. Physik. Chem.* (B) 43 (3), pp. 309–328 (1939) (translation).

Yamashiki et al., "Characterisation of Cellulose Treated by the Steam Explosion Method. Part 1: Influence of Cellulose Resources on Changes in Morphology, Degree of Polymerisation, Solubility and Solid Structure," *British Polymer Journal*, 22:73–83 (1990).

Yamashiki et al., "Characterisation of Cellulose Treated by the Steam Explosion Method. Part 2: Effect of Treatment Conditions on Changes in Morphology, De- (List continued on next page.)

*Primary Examiner*—Nathan M. Nutter

*Attorney, Agent, or Firm*—Klarquist, Sparkman, Campbell, Leigh & Whinston

[57] ABSTRACT

A method of processing cellulose sausage skins is disclosed in which sausage skins are filled with contents to make sausages, the cellulose sausage skins are removed from the sausages, the removed sausage skins are dissolved to form a recycled cellulose dope, and new sausage skins are formed from the recycled cellulose dope. Dissolving sausage skins under soda cellulose Q condition for subsequent reuse is specifically described. In addition, forming a dissolved cellulose feed stock for use in producing sausage skins employing cavitation and a solvent is disclosed.

30 Claims, 3 Drawing Sheets

OTHER PUBLICATIONS gree of Polymerisation, Solubility in Aqueous Sodium Hydroxide and Supermolecular Structure of Soft Wood Pulp During Steam Explosion," *British Polymer Journal*, 22:121-128 (1990).

Yamashiki et al., "Characterisation of Cellulose Treated by the Steam Explosion Method. Part 3: Effect of Crystal Forms (Cellulose I, II and III) of Original Cellulose on Changes in Morphology, Degree of Polymerisation, Solubility and Supermolecular Structure by Steam Explosion," *British Polymer Journal*, 22:201-212 (1990).

Kamide et al., "Structural Change in Alkali-Soluble Cellulose Solid During its Dissolution Into Aqueous Alkaline Solution," *Cellulose Chem. Technol.*, 24:23-31 (1990).

G. Jayme, "Interrelations Between Degree of Swelling Behaviour During Beating, and Strength-Development of Pulps; Including the Beating in Weakly Alkaline Medium," *Weekly Journal for Paper Manufacture*, vol. 93, No. 20, 26 pages (Oct. 1965) (translation).

Boucher et al., "Sonic and Ultrasonic Irradiation of Cotton Fibers Part I: Irradiation in Liquid Phase," *Textile Research Journal*, vol. 37, No. 8, pp. 621-634 (Aug. 1967).

Laine et al., "Comparison of the Properties of Ultrasonically and Mechanically Beaten Fibers," from Solvent Spun Rayon, Modified Cellulose Fibers and Derivatives Symposium, New Orleans, La., Mar. 21-23, 1977, pp. 245-248.

Labosky et al., "Properties of Paper Obtained From Ultrasonically and Mechanically Beaten Pulps," *Wood Science*, vol. 1, No. 3, pp. 183-192 (Jan. 1969).

Iwasaki et al., "Studies on Beating of Pulp (II) Effect of Ultrasonic Treatment on Chemical Pulps," *J. Jap. Tappi*, 21, No. 10, pp. 557-563 (Oct. 1967).

Laine et al., "Influence of Ultrasonic Irradiation on the Properties of Cellulosic Fibres," *Cellulose Chem. Technol.* 11, No. 5, pp. 561-567 (Sep./Oct. 1977).

Szwarcsztajn et al., "Investigations of the Changes in Pulp Fibers and Fines Treated with Ultrasonic Vibrations," *Przeglad Papierniezy*, 26 (10): 331-3 (Oct. 1970).

Laine et al., "Applications of Ultrasound in Pulp and Paper Technology," Specialnummer 4a, 1977 Paperi ja Puu-Papper och Tra, pp. 235-247.

P. Willems, "Application of Ultrasonic Techniques to Pulping and Refining," *World's Paper Trade Review*, 155, No. 19: 1743-4, 1746, 1748, 1752, 1754, 1756 (May 11, 1961).

Suslick et al., "Sounding Out New Chemistry," *New Scientist*, pp. 50-53 (Feb. 3, 1990).

A. Weissler, "Depolymerization by Ultrasonic Irradiation: The Role of Cavitation," *Applied Physics*, vol. 21, pp. 171-173 (Feb. 1950).

Melville et al., "The Ultrasonic Degradation of Polymers," from Degradation of Polymers, pp. 996-1009, received Apr. 11, 1950.

Alexander et al., "The Role of Free Radicals in the Degradation of High Polymers by Ultrasonics and by High-Speed Stirring," *J. of Poly. Sci.*, vol. XII, pp. 533-541 (1954).

Brett et al., "Degradation of Long Chain Molecules by Ultrasonic Waves. Part V. Cavitation and the Effect of Dissolved Gases," *J. of Poly. Sci.*, vol. XIII, pp. 441-459 (1954).

M. Mostafa, "Degradation of Addition Polymers by Ultrasonic Waves," *J. of Poly. Sci.*, vol. XXIII, pp. 535-548 (1956).

M. Mostafa, "The Degradation of Addition Polymers by Ultrasonic Waves. II.," *J. of Poly. Sci.*, vol. XXVII, pp. 473-480 (1958).

M. Mostafa, "The Degradation of Addition Polymers by Ultrasonic Waves. III.," *J. of Poly. Sci.*, pp. 501-518 (1958).

M. Mostafa, "Degradation of Addition Polymers by Ultrasonic Waves. IV. The Effect of Ultrasonic Intensity," *J. of Poly. Sci.*, vol. XXVIII, pp. 519-536 (1958).

M. Mostafa, "Degradation of Addition Polymers by Ultrasonic Waves. V. Effect of Initial Average Chain Length," *J. of Poly. Sci.*, vol. XXXIII, pp. 295-310 (1958).

Berlin et al., "Studies in the Field of Machanochemistry-VI. A Study of the Disintegration of Polystyrene in Solutions Under the Influence of Ultrasonic Vibrations," Vysokomol. soedin, 1: No. 5, 688-696 (1959).

Wilson et al., "The Alkali Solubility of Pulp," *Svensk Papperstidning*, Arg. 55, Nr. 2 (Jan. 31, 1952).

K. Ohlsson, "The Alkali Solubility of Pulps I. Method," *Svensk Papperstidning*, Arg. 55, Nr. 10 (May 31, 1952).

Isogai et al., "Amorphous Celluloses Stable in Aqueous Media: Regeneration from SO2-Amine Solvent Sys- (List continued on next page.)

OTHER PUBLICATIONS tems," *J. of Poly. Sci.*, Part A: Polymer Chemistry, vol. 29, 113-119 (1991).

Chen et al., "Spun Cellulose Fiber Using Zinc Chloride as a Solvent," presented at ACS National Meeting, Apr. 25, 1990, Boston, Mass. (8 pages).

Isogai et al., "Dissolution Mechanism of Cellulose in N204-DMSO System," Sen-I Gakkaishi, vol. 42, No. 11 (1986).

Loubinoux et al., "An Experimental Approach to Spinning New Cellulose Fibers with N-Methylmorpholine-Oxide as a Solvent," *Textile Research Journal*, pp. 61-65 (Feb. 1987).

M. Pasteka, "Dissolution of Cellulose Materials in Aqueous Solutions of Benzyltriethylammonium Hydroxide," *Cellulose Chem. Technol.*, 18: 379-387 (1984).

Buijtenhuijs et al., "The Degradation and Stabilization of Cellulose Dissolved in N-Methylmorpholine-N-Oxide (NMMO)," 40 Jahrgang Heft 12, pp. 615-619 (1986).

R. Schweiger, "Anhydrous Solvent Systems for Cellulose Processing," *Tappi*, vol. 57, No. 1, pp. 86-90 (Jan. 1974).

Turbak et al., "A Critical Review of Cellulose Solvent Systems," Solvent Spun Rayon, Modified Cellulose Fibers and Derivatives, ACS Symposium Series 58, A. L. Turbak, ed., ACS, Washington (1977).

Turbak et al., "Cellulose Solvents," *Chemtech*, pp. 51-57 (Jan. 1980).

Gagnaire, et al., "Cellulose Organic Solutions: A Nuclear Magnetic Resonance Investigation," *J. of Poly Sci.*, Polymer Chemistry Edition, vol. 18, 13-25 (1980).

T. Ishii, "13C-NMR Spectra of Cellulose in Polar, Aprotic Solvents," 1983 International Symposium on Wood and Pulping Chemistry, pp. 28-32.

Isogai et al., "Dissolution Mechanism of Cellulose in SO2-Amine-Dimethylsulfoxide," *J. of App. Poly. Sci.*, vol. 33, 1283-1290 (1987).

Charkov et al., "Relation Between Swelling and Dissolution of Cellulose in Sodium Hydroxide Solutions," Izvestiya, Vysshikh Uchebnykh Zavedenii, 14, No. 5, 10-11, (1971) (translation).

Kamide et al., "Temperature Dependence of Limiting Viscosity Number and Radius of Gyration of Cellulose Dissolved in Aqueous 8% Sodium Hydroxide Solution," *Poly. J.*, vol. 19, No. 10, pp. 1173-1181 (1987).

Kamide et al., "CP/MASS 13C NMR Spectra of Cellulose Solids: An Explanation by the Intramolecular Hydrogen Bond Concept," *Poly. J.*, vol. 17, No. 5, pp. 701-706 (1985).

Kamide et al., "Study on the Solubility of Cellulose in Aqueous Alkali Solution by Deuteration IR and 13C NMR," *Poly. J.*, vol. 16, No. 12, pp. 857-866 (1984).

DRY PULP
120
WATER
122
124
HYDROPULPER
ALTERNATE PULP SOURCE
CELLULOSE FROM MANUFACTURING PROCESS
126
128
130
OPTIONAL SCREEN
132
134
136
MAKE-UP WATER
COOLING ELEMENT
MIX TANK
140
HYDROGEN BOND CLEAVING AGENT
138
142
144
CAVITATOR
146
DISSOLVED CELLULOSE FEED STOCK

DRY PULP
120
WATER
122
124
HYDROPULPER
ALTERNATE PULP SOURCE
CELLULOSE FROM MANUFACTURING PROCESS
126
128
130
OPTIONAL SCREEN
MAKE-UP WATER
132
134
136
MIX TANK
142
144
194
CAVITATOR
142
RECYCLE PROCESS WATER
192
DEWATERER
209
196
198
COOLING ELEMENT
MIX TANK
200
140
208
206
HIGH SHEAR MIXER
MAKE UP WATER
202
HYDROGEN BOND CLEAVING AGENT
211
210
DISSOLVED CELLULOSE FEED STOCK

METHOD OF PROCESSING CELLULOSE SAUSAGE SKINS

CROSS REFERENCE TO RELATED APPLICATION

This application is a continuation-in-part application of U.S. patent application Ser. No. 7/804,241, filed Dec. 5, 1991, invented by E. Peter Lancaster, and entitled METHOD OF PRODUCING CELLULOSE DOPE.

TECHNICAL FIELD

The present invention relates to processing cellulose sausage skins with sausages being defined herein as an edible substance surrounded in whole or in part and by a cellulose skin at least temporarily during manufacture. A specific example of such a sausage is a so-called "skinless" frankfurter or hot dog.

BACKGROUND OF THE INVENTION

Cellulose has been widely used in the production of sausage skins. In general, known commercial methods for processing cellulose into sausage skins involve exposing raw cellulose (e.g. Cellulose I) to an aqueous alkali solution, and adding complexing agents to produce a cellulose dope. The dope is then subjected to various processing steps to regenerate the cellulose. The cellulose produced by these methods is known as regenerated cellulose because the cellulose molecules are dissolved by the production of specific coordination complexes with the dissolving solvent. For example, according to one method, the raw cellulose is first steeped in sodium hydroxide. Carbon disulfide is then added to the resulting alkali cellulose crumb under specific conditions, resulting in the formation of sodium cellulose xanthanate. This coordination complex is then extruded in a tubular shape into an acid bath which converts the coordination complex into regenerated cellulose in the form of an elongated tubular sausage skin. Typically, sausage manufacturers add plasticizers or other materials in a conventional manner to the process prior to forming the skin.

The tubular skins are then dried, typically by blowing air through their center and along their exterior. The dried skins are then rolled or coiled because conventional sausage machines commonly use the skins in this form. That is, as the skins are uncoiled by the sausage machines, they are filled with the contents to make sausages. Again, these skins may be filled with any suitable edible material, including animal and vegetable food stuffs. Also, the sausage skins may be manually stuffed to form sausages.

During the manufacture of skinless sausages, at some point during the process after the skins are stuffed with their contents, the skin is stripped from the contents. The used sausage skins are then discarded in a landfill or in some cases incinerated. With the large volume of skinless sausages produced in this country, disposal of the used skins is costly and environmentally wasteful.

In the above-described process of producing these skins, the intramolecular hydrogen bonding in the cellulose is disrupted through the formation of coordination complexes between the alkali and the glucose of the cellulose. Two common methods for the production of regenerated cellulose are the viscose method and the cupraammonium method, with the viscose method commonly being employed to produce sausage skins. Each of these methods utilizes expensive materials, and each produces certain toxic by-products. Thus, although these methods have been successfully used for many years, environmental and economic concerns are inherent with each method. In addition, because the glucose moieties of regenerated cellulose produced by either the viscose method or the cupraammonium method exist as a coordination complex, the degree of polymerization of the molecule is reduced. As the number of coordination complexes in the regenerated cellulose increases, the intramolecular hydrogen bond forming sites on the cellulose molecules decrease. This generally decreases the commercial desirability of the resulting sausage skins because an increased number of intramolecular hydrogen bonding sites generally produces higher quality finished products.

It is known that cellulose swells when it is exposed to the hydrogen bond cleaving agent, sodium hydroxide. Swelling in the cellulose by nearly 1,000 percent is achieved upon exposure to sodium hydroxide maintained at soda cellulose Q condition. This is explained in an article by Sobue, et al., entitled "The Cellulose-Sodium Hydroxide-Water System as a Function of Temperature", Z.Physik Chem. (B) 43 (3), 1939. Soda cellulose Q condition occurs when cellulose is in an aqueous solution of 6 percent to 10 percent by weight of sodium hydroxide, at a temperature between −7° C. and 4° C. The aqueous sodium hydroxide penetrates between the fiber layers. This extends the lattice structure and results in the formation of large, irregular distances therebetween. However, only the amorphous fraction of cellulose 1 fibers (e.g. about 20–30 percent) dissolves under these conditions.

Despite the fact that cellulose Q condition has been known for over 50 years, no one known to the present inventor has recognized the applicability of this technology to processing of sausage skins. Instead, as explained above, sausage skins stripped from sausages are wasted, typically either being sent to a landfill or incinerated.

Therefore, a need exists for an improved method of forming and processing sausage skins.

SUMMARY OF THE INVENTION

In accordance with the present invention, a method of recycling used sausage skins has been discovered. In addition, a method of dissolving used sausage skins to make the recycled cellulose available for producing new sausage skins and other purposes has also been discovered. Furthermore, an improved mechanism for providing dissolved cellulose feed stock for use in manufacturing sausage skins has also been discovered.

In accordance with one aspect of the present invention, cellulose sausage skins are filled with contents to make sausages, the sausage skins are removed from the sausages, and the removed sausage skins are dissolved to form a recycled cellulose dope. In addition, new sausage skins are formed from the recycled cellulose dope, thereby minimizing the waste associated with discarding sausage skins after one use.

Preferably the dissolving step is accomplished by placing the removed sausage skins in a slurry at or near cellulose Q condition. Most preferably, the removed sausage skins are placed in a slurry with an NaOH concentration of 6 to 10 percent by weight and at a temperature of between −7° C. and 4° C.

The steps of filling cellulose sausage skins, removing the cellulose skins, dissolving the removed sausage skins to form a recycled cellulose dope and forming sausage skins from the recycled cellulose dope may be repeated plural times. However, the exact number of times that cellulose sausage skins can be recycled has yet to be determined. It is expected that the degree of polymerization of the cellulose will be decreased during the recycling process until eventually the dissolved cellulose will become unsuitable for sausage skins and must be used in another process, blended with virgin (unused dissolved cellulose) or discarded.

Additional cellulose may be added to the process to replace cellulose lost during recycling. That is, there will be some loss of material during recycling as it is impractical to attempt recover 100 percent of the cellulose in the original sausage skins for recycling. This added cellulose may be in raw, undissolved form or in dissolved form. If undissolved, the added cellulose must be subjected to a dissolving process before being used in the formation of sausage skins together with the recycled cellulose dope from the used skins.

Although other techniques may be used, it is preferable from an environmental standpoint to provide the additional dissolved cellulose, as well as cellulose used initially in forming skins, by subjecting a cellulose slurry to cavitation and a solvent. Applicant's preferred solvent is NaOH, at from 6 to 10 percent by weight with the cellulose slurry being at a temperature of $-7°$ C. to $4°$ C. Cavitation is accomplished by applying pulsed energy to the raw cellulose slurry to induce cavitation. For example, the raw cellulose may be in the form of a pulp slurry. Also, rayon or other processed cellulose may be dissolved with or without cavitation to provide the initial dissolved cellulose feed stock for the sausage skins. However, it is typically less costly to start with raw cellulose in the form of a wood pulp slurry instead of a cellulosic material such as rayon. The pulsed energy when applied produces pressure waves in the slurry. A preferred approach is to apply sonic or ultrasonic energy consisting of expansive and compressive ways to cause cavitation within the slurry.

Although the invention is not limited to any particular theory of operation, it is believed that the waves cause bubbles of air entrained in the slurry to expand and recompress. This alternating expansion and compression is further believed to cause the implosive collapse of the air bubbles, resulting in adiabatic heating to temperatures in the thousands of degrees and pressures of up to thousands of atmospheres. The imploding air bubbles are understood to produce powerful shock waves which impinge on pulp fibers in their path with jet velocities on the order of about 500 m/s and shock pressures of about 5 Kbars. Regardless of the exact mechanism, cavitation results in the efficient delamination and fibrillation of the pulp fibers by peeling back the layers of fiber. Due to the delaminated nature of the fibers resulting from cavitation, the fibers are highly accessible to solvents for dissolution.

By placing the slurry under pressure, greater amounts of energy must be introduced into the slurry to cause cavitation, due to the increased vapor pressure of gas in a pressurized slurry. When cavitation does occur under these conditions, more energy is released by the imploding bubbles into the slurry, which improves the desired fibrillation/delamination of the cellulose fibers. Also, less time is required for the fibrillation of the cellulose fibers to occur.

The delaminated pulp is dissolved into a cellulose dope by treatment with a solvent, such as an alkaline solvent with NaOH at soda cellulose Q condition being the most preferred approach. Because the fibers are peeled back by the application of pulsed energy and cavitation within the slurry, the cellulose may be efficiently exposed to hydrogen bond cleaving agents or other solvents.

The cellulose may be slurried and subjected to cavitation with the resulting delaminated cellulose thereafter dissolved in the solvent. Alternatively, the cellulose may be subjected to cavitation while the cellulose is in a slurry with a dissolving agent. In addition, the cellulose may be in a slurry with a dissolving agent and repeatedly subjected to cavitation. Thus, the sequence of subjecting the cellulose to cavitation and a solvent may be varied.

Again, although other approaches for providing dissolved cellulose, such as the viscose method, the method described in U.S. Pat. No. 4,634,470 to Kamide, et al., as well as other known approaches may be used, the preferred method of providing the dissolved cellulose feed stock for use in sausage skin formation involves the subjection of Cellulose I (or other cellulose) to cavitation and a suitable solvent.

It is another object of the present invention to provide an improved method of forming sausage skins.

It is therefore one object of the present invention to provide an improved method of recycling sausage skins to form new sausage skins.

A still further object of the present invention is to provide an improved method of disposing of sausage skins.

The above objects, features and advantages of the present invention are important, both alone and in combination. These and other features, advantages and objects of the present invention will become more apparent with reference to the following description and drawings.

DETAILED DESCRIPTION OF THE PREFERRED EMBODIMENT

In accordance with the present invention, a method of processing cellulose sausage skins is described. For purposes of this patent application, the term "sausage" refers to an edible material, whether it be meat, fish, poultry, vegetable or otherwise, enclosed at least in part in a cellulose skin or casing. The term "sausage" applies to products which are only temporarily encased in a skin during their manufacture as well as those which are sold in the skin. However, from a recycling standpoint, the invention is particularly advantageous when applied to so-called "skinless" sausages. Sausages of this type are typically provided in a cellulose skin during the manufacturing process, with the skin being removed as part of the process before the product is distributed. Examples of this type of sausage includes the so-called "skinless" frankfurters or hot dogs. In this case, the manufacturer of these products has a substantial volume of used sausage skins available for recycling.

Figure 1:
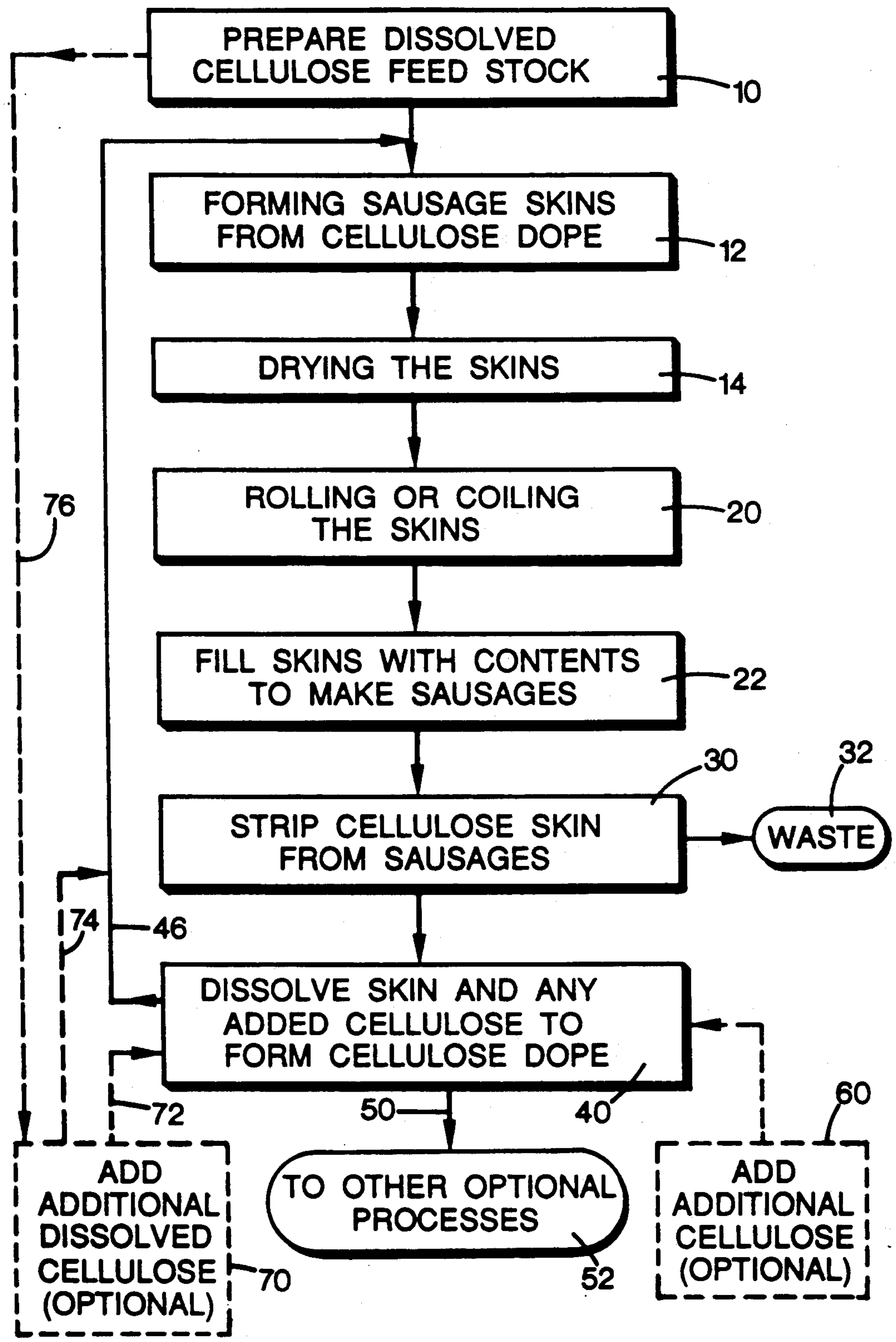
FIG. 1 is a process flow chart illustrating the sausage skin processing method of the present invention.

With reference to FIG. 1, at block 10 cellulose feed stock for preparation of cellulose sausage skins is prepared. Any known approach may be utilized to prepare the dissolved cellulose feed stock, including the viscose process. However, because of environmental and other benefits as explained below, the preferred approach for preparing dissolved cellulose feed stock is described in connection with FIGS. 2 and 3. Additives preferred by the sausage manufacturer are typically added to the dissolved cellulose feed stock. For example, plasticizers such as glycerine may be included in a conventional manner.

At block 12, the sausage skins are formed from the cellulose dope. Utilizing conventional equipment, the cellulose dope is extruded typically into a bath which neutralizes or eliminates any solvent included in the dope. For example, if the cellulose dope includes an alkali solvent, the dope is extruded into an acid bath. As a specific example, if the cellulose dope includes NaOH in a concentration of from 6 to 10 percent by weight, a solution containing 10 percent by weight sulfuric acid and about 18 percent by weight sodium sulfate is one preferred form of neutralizing bath. If the dope is formed in the manner of FIGS. 2 and 3, the formation of a coordination complex is eliminated. Consequently, the production of toxic by-products is eliminated. Also, a high degree of polymerization exists in the resulting dissolved cellulose produced in accordance with FIGS. 2 and 3 so that sausage skins produced from this material will be strong. Typically, the cellulose dope is extruded in a continuous elongated tube which coagulates or forms an elongated sausage skin in the bath.

Although not necessary, in a conventional sausage manufacturing operation, the sausage skins produced in this manner are dried as indicated at block 14. A common technique for drying the sausage skins is to blow air through the interior and along the exterior of the skins.

Depending upon how the skins are to be used, a block 20 may be reached, corresponding to the rolling or coiling of the skins. Conventional sausage manufacturing equipment utilizes skins in a roll form during the sausage stuffing operation. Of course, the skins produced in this manner may be manually stuffed or used directly without being rolled or coiled.

At block 22, the skins are filled with their edible contents to make the sausages. For example, the skins may be filled with ground meat, poultry and/or vegetable material, together with various spices and other ingredients to be included in the product being made.

At block 30, the used cellulose skin is stripped or removed from the sausages. At this stage of the process, the skins may be cleaned, as by washing with hot water to remove residual stuffing material. Thus, this block applies to the so-called "skinless" sausages from which the skin utilized during the manufacturing process is removed prior to packaging and shipment of the product. Of course, if a practical way is found to collect skins from restaurants and other users, the block 30 will then be performed by these users who remove skins from "skinned" sausages as they are used.

In the prior art, skins stripped from sausages insofar as is known by inventor have heretofore been discarded as waste, as indicated at block 32, or otherwise disposed of, for example by incineration.

In accordance with the present invention, the stripped or removed cellulose skins are dissolved at block 40 to form a recycled cellulose dope. Preferably, the dissolving step is accomplished by placing the removed sausage skins in a slurry at or near soda cellulose Q condition. More specifically, the preferred dissolving step comprises the step of placing the removed sausage skins in a slurry with an NaOH concentration of 6 percent to 10 percent by weight and at a temperature of between −7° C. and 4° C.

The dissolved skins in the form of the recycled cellulose dope may then be processed to form new sausage skins which are again filled with contents to make sausages. This is indicated by the line 46 leading from block 40 back to the block 12. Thus, used sausage skins are reformed into new sausage skins for refilling with contents to form sausages.

The caustic bath, such as a slurry of NaOH at from 6 percent to 10 percent by weight and at a temperature of between −7° C. and 4° C., and acid bath used in the production of skins from the used skins acts as a disinfectant and sanitizer to kill undesired bacteria that may have been introduced into the process.

Although the sausage skins may be dissolved to form a recycled dope and reformed into new sausage skins plural times, it is expected that the degree of polymerization of cellulose in the sausage skins will be reduced over time as a result of this recycling process. Therefore, it is possible that the recycled cellulose dope will eventually have such a low degree of polymerization that it is no longer suitable for manufacturing sausage skins. However, in the event this condition is reached, the recycled cellulose dope, as indicated by line 50, may be used in other processes as indicated at block 52. For example, it may be combined with additional dissolved cellulose and used in the formation of rayon or other shaped cellulose articles. Similarly, rather than utilizing the dissolved sausage skins to form new sausage skins, all or a portion of the recycled cellulose dope may be transferred to these other optional processes. Again, the cellulose used in the sausage skins may thus be reused at least once, and preferably more times, before being discarded.

As indicated by block 60, additional undissolved cellulose may be added to the removed cellulose skins either before or after the cellulose skins are dissolved to form the recycled cellulose dope. This added cellulose would then be dissolved for use with the dissolved used skins. Assuming Cellulose I, that is raw cellulose, is added to the sausage skins at block 60, this added cellulose may be dissolved in the same manner as explained above in connection with block 10 with respect to the preparation of the dissolved cellulose feed stock. The preferred approach would be to subject the added cellulose and removed skins in slurry to cavitation and a solvent as explained below in connection with FIGS. 2 and 3. Again, a preferred solvent is NaOH at from 6 to 10 percent by weight with the cellulose slurry being at a temperature of from −7° C. to 4° C. to dissolve the added additional cellulose and removed skins.

Rather than adding Cellulose I at block 60, regenerated cellulose, such as rayon, may be added at this location in the process. The rayon would then be dissolved in the same manner as the skins to form recycled cellulose dope which includes both the dissolved skins and the dissolved additional cellulose. In this case, cavitation is typically unnecessary as dissolution can take place, for example, at soda cellulose Q condition.

Added cellulose may be incorporated into the process by introducing additional dissolved cellulose as indicated at block 70. For example, as indicated by lines 72 and 74, this additional dissolved cellulose may be added to the dissolved skins (either before or after dissolving the skins). The additional dissolved cellulose may be obtained in accordance with any process and may be provided from the dissolved cellulose feed stock prepared at block 10 as indicated schematically by the line 76. Again, although not necessary, the preferred approach is to provide the additional dissolved cellulose by subjecting raw cellulose to cavitation and a solvent, such as NaOH at soda cellulose Q condition.

Thus, in accordance with the method of the present invention, an improved environmentally sensitive method of processing sausage skins, recycling sausage skins, and reusing cellulose from sausage skins is provided.

PREPARATION OF DISSOLVED CELLULOSE FEED STOCK FOR USE IN FORMING SAUSAGE SKINS

Figure 2:
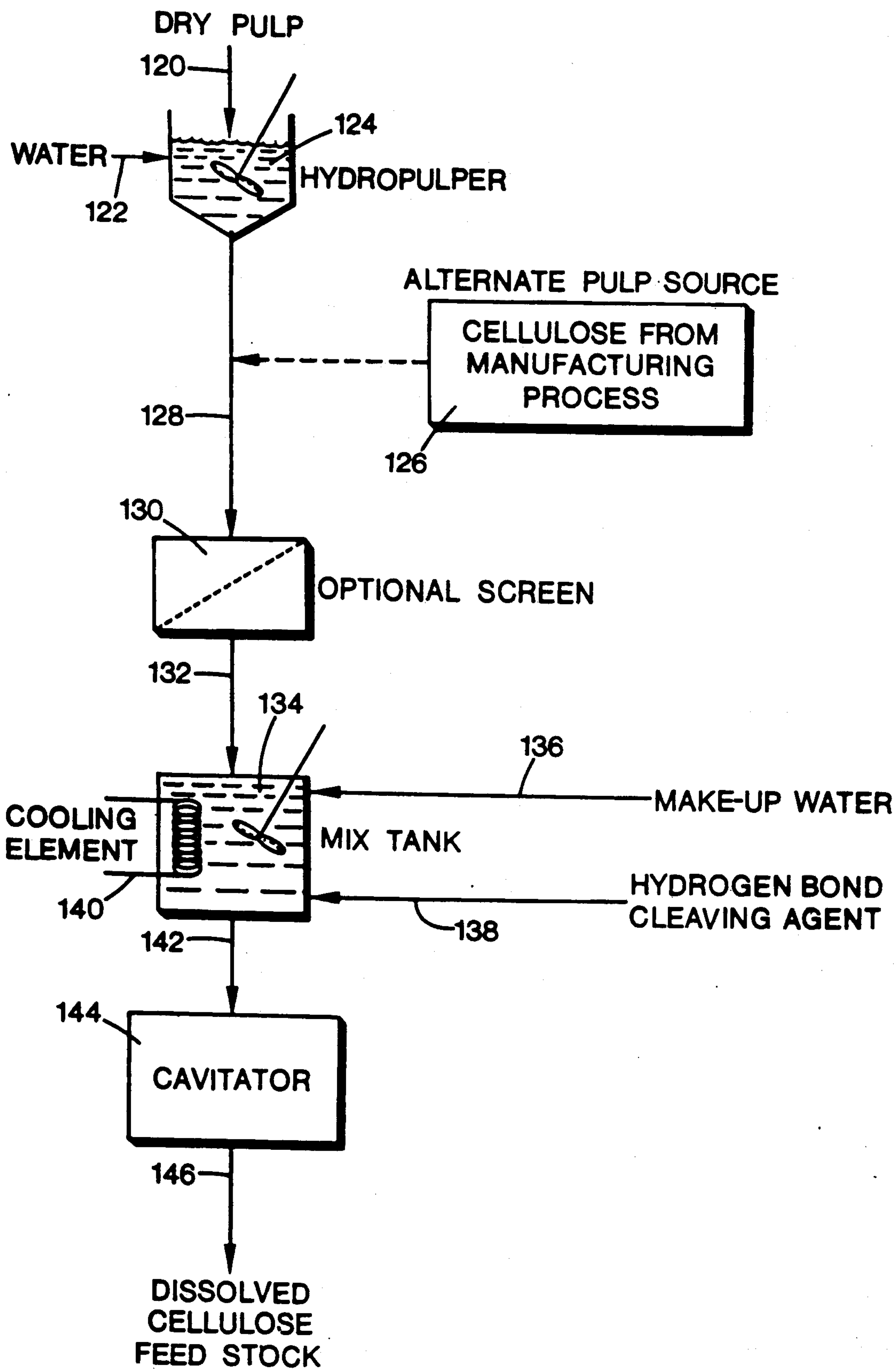
FIG. 2 is a block diagram of one form of a single stage cellulose dope production process for providing dissolved cellulose for use in manufacturing sausage skins.
Figure 3:
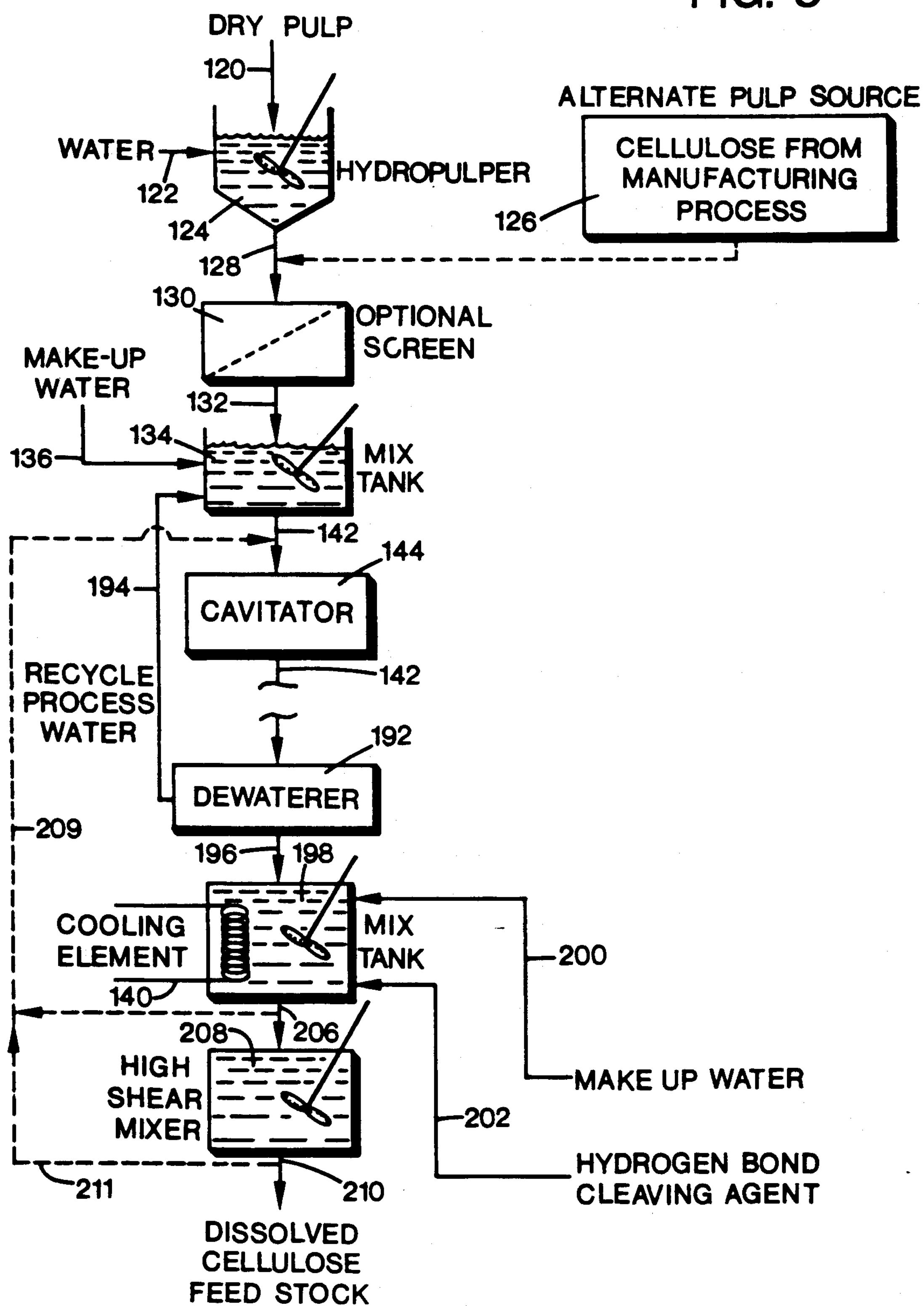
FIG. 3 is a block diagram of a two stage cellulose dope production process used in producing dissolved cellulose for sausage skin formation, wherein cavitation of the cellulose slurry occurs prior to its exposure to a hydrogen bond cleaving agent.

The description proceeds with reference to FIGS. 2 and 3 relating to the preferred process of providing dissolved cellulose feed stock at block 10 of FIG. 1. This process may also be used at block 40, particularly if raw cellulose in the form of Cellulose I is added to the removed sausage skins either before or after the sausage skins are dissolved.

The preferred process of producing cellulose dope for use in forming sausage skins is different from cellulose produced in the typical industrial setting. For purposes of this description, a cellulose dope is defined as cellulose dissolved in a solvent. The preferred approach does not require a derivative step in order to dissolve the cellulose, therefore the step of regeneration from a derivative is not necessary in the sausage skin shaping process. The cellulose in the dope of the present invention may have a high degree of polymerization, such as above 400, and no limitations have been found to the degree of polymerization of the starting material. Therefore, virtually any type of cellulose may be used in the process, including cellulose from hardwood and softwood trees.

With reference to FIG. 2, a single stage cellulose dope production process is illustrated. In this embodiment, the dope is produced by exposing a cellulose slurry to a hydrogen bond cleaving agent before the slurry is subjected to pulsed energy to cause cavitation.

More specifically, dry pulp 120 is combined with water 122 in hydropulper 124 to produce a pulp slurry 128. Alternately, the pulp output from a pulp manufacturing process 126 can be used directly as the pulp slurry 128. Because pulp manufacturing plants have facilities in place for treating waste water, by operating the process on the site of a pulp manufacturing plant, separate waste water treatment equipment is not needed. The existing waste water equipment can be used for treating both the pulp production and the cellulose dope production waste water. Also, never-dried pulp (which has a high initial degree of polymerization) may be used to enhance the degree of polymerization of the cellulose in solution resulting from the process. Of course, other sources of cellulose may be used in addition to pulp. The pulp slurry 128 may be passed through an optional screen 130 to remove shives and foreign material. The screened pulp slurry 132 is placed in mix tank 134 with make-up water 136 and a hydrogen bond cleaving agent 138.

Preferably, the hydrogen bond cleaving agent is an aqueous alkali solution, such as of sodium hydroxide, potassium hydroxide, lithium hydroxide, beryllium hydroxide and/or cesium hydroxide. Other cellulose solvents may also be used, such as identified in U.S. Pat. No. 4,634,470, which is incorporated by reference herein. However, sodium hydroxide is the most preferred hydrogen bond cleaving agent.

If used, the sodium hydroxide and other alkali cleaving agents are mixed to a concentration of between 6 percent and 10 percent by weight to the total weight of the slurry in a mix tank 134. Make-up water 136 or other liquid is typically added to bring the cellulose concentration to a level in which cavitation is achievable. Preferably, the cellulose is slurried to a sufficient extent to be flowable through the cavitation device used in the process. In general, cellulose from about 5 percent to about 8 percent by weight to the total weight of the cellulose and other slurry components would be considered flowable. However, a lesser cellulose concentration in the slurry, such as about 1.5 percent, is typically easier to process.

To achieve the most preferred soda cellulose Q conditions when sodium hydroxide is being utilized as the hydrogen bond cleaving agent, the contents of the mix tank are cooled using cooling element 140. As noted, soda cellulose Q conditions are achieved when the mix tank contents are cooled to between −7° C. and 4° C.

In this specific example, the cold pulp slurry 142, which is at soda cellulose Q condition, is pumped through cavitator 144. In the preferred embodiment, the cavitation is achieved by exposing the slurry to sufficient pulsed energy to cause cavitation. Preferably, the pulsed energy is applied in the form of pressurized waves. Any suitable source of pulsed energy may be used such as electronic signal generators including piezoelectric electronic horns, magneto restrictive systems and mechanical vibrating systems including liquid whistles. Mechanical sonolators such as a Dispersonic System Model 15 BT from Sonic Corporation of Stratford, Conn., or sonic signal generators such as a Model EGR-1600B Power Generator from E.N.I. Power Systems Incorporated of Rochester, N.Y., have proven effective for this purpose.

In the preferred embodiment, energy within the frequency range at which cavitation occurs is applied to the slurry. Cavitation refers to transient cavitation; namely, the generation of and implosion of bubbles in the slurry. Although variable, a preferred frequency range of the pulsed energy is from about 500 Hz to about 1 Mhz and a most preferred frequency is about 20 kHz. One would select a frequency at which effective cavitation occurs for the particular slurry and pressure conditions. Although the energy can be varied, as a specific example, effective delamination of fibers has been observed when the slurry is exposed to energy at 20 kHz of about 250 watts for at least about 8 minutes per gram of slurry. The exact processing parameters depend upon the type of cellulose which is being processed. It appears that hardwood cellulose fibers require either a longer treatment time, a higher energy, or both to cause effective delamination of the fibers.

The cavitation causes the pulp fibers to peel open, providing effective access to the hydrogen bond cleaving agent 138 (in this case sodium hydroxide) to react with the cellulose structure. The sodium hydroxide cleaves the intramolecular hydrogen bonding in the cellulose molecule, which results in dissolved cellulose feed stock 146. This feed stock is then used in the formation of sausage skins, e.g. the dissolved cellulose feed stock from block 10 of FIG. 1.

The resulting fibers are not exploded or fragmented, such as occurs with the steam explosion of U.S. Pat. No. 4,634,470. The explosion technique, in effect, results in chopped, shortened cellulose fibers which, when processed, result in a lower degree of polymerization of the resulting feed stock. During cavitation, the fiber layers tend to be peeled back lengthwise, thereby minimizing the chopping and shortening of the cellulose structure. This facilitates the achieving of a higher degree of polymerization in the resulting feed stock 146. The peeling back of the fiber layers also allows the hydrogen bond cleaving agent a greater surface area to react and dissolve the cellulose fiber.

Although variable somewhat depending upon the original source of cellulose, for wood pulp cellulose, preferred soda cellulose Q conditions were found to be a sodium hydroxide concentration of from 6 percent to 10 percent by weight sodium hydroxide to the total weight of the slurry and a temperature in the range of from −7° C. to 4° C. The most preferred soda cellulose Q conditions are a sodium hydroxide concentration of 9 percent by weight and a temperature between −4° C. and 2° C.

FIG. 3 illustrates a dissolved cellulose feed stock preparation process utilizing a two stage cellulose dope production process, wherein the pulp slurry is subjected to cavitation prior to its being combined with an hydrogen bond cleaving agent. In this embodiment, elements in common with the embodiment of FIG. 2 have been assigned like numbers and will not be discussed in detail.

In this embodiment, the mixed slurry on line 142 is pumped into cavitator 140 wherein the cavitation process again results in the fibrillization of the pulp fibers.

The slurry 182 is then passed through a dewaterer 192 at which the recycle process water 194 is recycled into mix tank 174. The dewatered pulp 196 is sent to mix tank 198. By dewatering the pulp and recycling the process water, liquid utilized in the cavitation operation is separated from liquid containing the cellulose solvent. However, the dewatering step may be eliminated, in which case the solvent is added to the slurried cellulose either before, during or after the cavitation step 144. In mix tank 198, like tank 134 described above, the dewatered pulp 196 is mixed with make-up water 200 and hydrogen bond cleaving agent 202, such as sodium hydroxide. The concentration of sodium hydroxide in mix tank 134 is again preferably maintained between about 6 percent and 10 percent by weight to the total weight of the slurry. Make-up water 200 is added to bring the cellulose concentration to the desired level, such as at least 1.5 percent by weight. The contents of the mix tank are cooled to achieve soda cellulose Q conditions using cooling element 204. When the hydrogen bond cleaving agent is sodium hydroxide, the mix tank contents are preferably cooled to between about −7° C. and 4° C., thereby achieving soda cellulose Q conditions.

The cold pulp slurry 206 is pumped into a high shear mixer 208, such as a Henschel Mixer Type FM-10C from Pernell International of Houston, Tex. This facilitates reaction of the hydrogen bond cleaving agent 202 with the delaminated cellulose, which results in formation of dissolved cellulose feed stock 210.

Again, the most preferred soda cellulose Q conditions for wood pulp cellulose were found to be a sodium hydroxide concentration of 9 percent by weight and a temperature between −7° C. and 2° C.

As indicated by the optional process lines 207 and 209 in FIG. 3, rather than subjecting the cellulose to a single pass through a cavitator 144 (the cavitator 144 may, itself, of course, have plural cavitation stages to increase throughput), the cellulose and solvent slurry may be recirculated through the cavitator. Although this approach reduces the degree of polymerization of the resulting feed stock, the cavitator causes a mixing of the cellulose and solvent in the slurry and enhances the dissolution of the cellulose. Also, with this modification the dewaterer 192 and mixer 208 is typically eliminated. However, as indicated by line 211, recirculation can also be accomplished after mixing.

In both the single stage and two stage process, there exists the alternative option of using cellulose fiber directly from a pulp manufacturing process. This option will be more cost efficient from the standpoint of eliminating the additional costs involved in drying the pulp and shipping to the cellulose production site. This option also eliminates the costs involved in rehydrating the dried pulp with a hydropulper. Also, the drying of pulp promotes hydrogen bonding between the cellulose molecules in the fiber. Therefore, it takes less energy to dissolve the cellulose with the pulp directly from the manufacturing process option than it would with hydropulping the dry pulp.

The cellulose dope may then be processed at the site of the pulp mill into sausage skins or transported to a separate sausage skin manufacturing site.

Cavitation of the pulp slurry by pumping the slurry through a cavitator is an important component in the event the preferred approach of providing the cellulose feed stock is used, whether such cavitation occurs before or after the cellulose is exposed to a hydrogen bond cleaving agent. Again, during cavitation the fiber layers are peeled back lengthwise, minimizing the tearing of the cellulose structure, allowing a higher degree of polymerization to be achieved. The peeling back of the fiber layers also allows the hydrogen bond cleaving agent a greater surface area to react and dissolve the cellulose fiber. This peeling back occurs whether the cellulose is treated with a solvent before, after, or during cavitation.

In a pre-cavitation treatment with solvent (e.g. NaOH) approach, the degree of polymerization of the finished product is harder to control and usually lower than in the process where cavitation is first performed followed by subjecting the slurry to a solvent. For example, the degree of polymerization of the cellulose dope is typically in the range from 200–400 when the cellulose in solvent is subjected to cavitation, and about 400–600 or higher when cavitation is applied prior to subjecting the material to the solvent. This difference is believed due to hydrodynamic forces caused by cavitation which not only peel back the fiber layers, but also cause scission in the cellulose molecules already in solution when the material in solvent is being subjected to cavitation. The scission is believed caused both by shear forces caused by microstreaming or by friction generated by relative movement of solvent and polymer molecules. This scission results in a lower degree of polymerization.

In the successive approach of cavitating the slurry first, followed by treatment with a solvent, the degree of polymerization tends to be higher and easier to control. In this latter approach, optimum conditions for cavitation may be set independently of the optimum conditions for effective dissolution. Also, because cavitation is applied to the material prior to inclusion in a solvent, the cavitation will not cleave the polymer molecules because the cellulose molecules have not been dissolved out of the cellulose fiber structure. This results in a higher degree of polymerization of the final product.

The cavitation systems illustrated in FIGS. 1 and 2, may be assembled in series systems with plural systems of FIGS. 1 and/or 2 interconnected in series or in parallel combinations, or in series-parallel combinations, as desired.

The cellulose slurry can also be pressurized prior to cavitation. The pressurization results in an increase in the energy which must be applied to the slurry solution to cause cavitation, and correspondingly results in a greater release of energy by bubbles collapsing during cavitation. This greater release of energy results in higher forces impacting the cellulose fibers during cavitation, which results in more efficient fibrillization of the fibers. For example, the slurry may be placed in a pressurized vessel in which cavitation takes place, with a typical pressure being from slightly above one ATM to about five ATM. In general, Pv (the vapor pressure of a bubble in the slurry) must be greater than the difference between Ph (the applied hydrostatic pressure) and Pa (the pressure of the applied pulsed energy) for cavitation to occur. Therefore, selection of the applied pressure depends upon factors such as the equipment being used, the solvent being used, the temperature, and the available pulsed energy.

EXAMPLE I

About 51 grams of removed cellulose sausage skins from Viscase Company, Inc. of Chicago, Ill., were obtained and placed in a slurry. The slurry was at soda cellulose Q condition with a slurry concentration of 5.4 percent by weight cellulose (the removed sausage skins) to the total weight of the slurry, and at a constant temperature of about 2°. The solvent in the slurry was NaOH at a concentration of 9 percent by weight to the total weight of the slurry. Under these conditions, the removed sausage skins dissolved completely when left overnight under these conditions (the actual dissolution time is unknown), insofar as could be determined by visual observation. When subjected to Nmr analysis, the recycled cellulose dope exhibited an Nmr peak at 79.9 ppm, corresponding to dissolved cellulose and additional noncellulose signals at 73.7 and 64.1 ppm, corresponding to glycerin, an additive included as a plasticizer in the Viscase sausage skins.

This recycled cellulose dope is expected to have a degree of polymerization which corresponds very closely to the degree of polymerization of the material initially used to produce the sausage skins which were then recycled in this experiment. Consequently, this recycled cellulose dope would be expected to have the properties required for producing sausage skins from the recycled cellulose dope in the same manner that sausage skins are produced from virgin (unrecycled) cellulose dope. Also, no derivatives are produced during the recycling of the sausage skins because the starting material (the used skins) is regenerated cellulose. This recycled cellulose dope is also usable in producing other shaped cellulose products, such as thread, yarn, and sheets.

As an additional experiment, rayon was slurried at soda cellulose Q condition with a slurry concentration of 4 percent by weight cellulose (from the rayon) to the total weight of the slurry, at a temperature of −1° C. and a total cellulose weight of 6.6 grams. The solvent in the slurry in this case consisted of NaOH at a concentration of 9 percent by weight of the total weight of the slurry and components therein. Under these conditions, all of the cellulose appeared visually to have dissolved. When subjected to Nmr analysis, the dissolved rayon exhibited a peak at 79.9 ppm, corresponding to dissolved cellulose.

Therefore, the cellulose dope produced from recycled sausage skins from a dissolved cellulose standpoint was like the cellulose dope produced from rayon, indicating that rayon may be used as a starting material in the production of sausage skins. This assumes that the particular rayon does not have additions which are unapproved for contact with food products. Thus, the cellulose feed stock used in sausage skin production may be from a variety of sources, including regenerated cellulose, recycled cellulose and materials such as wood pulp as explained more specifically below for wood pulp in connection with the further examples.

As a comparative experiment, sausage skins were slurried in sodium hydroxide at other than soda cellulose Q condition. Specifically, about 2 grams of sausage skins from Viscase Company were added to a slurry to provide a concentration of 2 percent by weight cellulose (from the sausage skins) to the total weight of the slurry. The sodium hydroxide was present at 9 percent by weight to the weight of the slurry. Rather than placing the sausage skins in the slurry at soda cellulose Q condition, the temperature of the slurry was maintained at room temperature, about 20° C. After being left overnight, a period of about 12 hours, the sausage skins visually appeared not to have been dissolved to any significant extent in the slurry. Upon thereafter lowering the temperature of the slurry to 1°–2° C., and leaving the material overnight at this temperature, visual observations confirmed that the sausage skins had apparently fully dissolved in the slurry. This confirmed the importance of dissolving the sausage skins at soda cellulose Q condition if sodium hydroxide is used as the solvent in the recycling process. Again, it is believed that dissolution is a much faster process as these experiments were conducted overnight merely for convenience.

EXAMPLE II

An experiment was conducted using a single stage process as illustrated in FIG. 2. VC-78 dissolving grade sulfite pulp, a softwood pulp from Weyerhaeuser Company, was slurried at soda cellulose Q condition with a slurry concentration of 2 percent by weight cellulose to the total weight of the slurry, an initial degree of polymerization of about 840, a constant temperature of −4° C., and total cellulose weight of 20 grams, was subjected to cavitation using a Sonics and Materials Incorporated (of Danbury, Conn.) Ultrasonic Processor Model VC-1500 at 20 kHz. The NaOH concentration in the slurry was set at 7 percent, 8 percent, and 9 percent, and the time of cavitation was set at 120 minutes, 180 minutes, and 240 minutes. The optimum results occurred at 8 percent NaOH concentration, and a treatment time of 180 minutes. Under those conditions, 94.3 percent of the cellulose dissolved with a degree of polymerization of 280. The experimental range of percent dissolved cellulose was between 72.96 percent and 94.3 percent. The experimental range of the resulting degree of polymerization was between 220 and 310. This experiment showed that the percent of dissolution and the degree of polymerization remained consistently high when the slurry was maintained in or near soda cellulose Q conditions. Under these conditions, Cellulose I (natural cellulose) easily went into solution, that is, at least about 70 percent of the cellulose in the slurry went into solution. More specifically, a substantial majority of at least 90 percent can be dissolved readily using the method of the present invention. This same approach was applied to other types of cellulose pulp subjected to a 9 percent w/w NaOH concentration, cavitation for 240 minutes at a temperature of 2° C., with the results being set forth in Table I, below.

TABLE I

| Pulp | Initial DP | Percent Dissolution | Solution DP |
|---|---|---|---|
| A | 1,250 | 90 | 240 |
| B | 1,177 | 82 | 260 |
| C | 1,418 | 77* | 240 |
| D | 1,110 | 82 | 220 |
| E | 930 | 80-90 (est.) | 390 |

A T-583 - Bleached sulfite (acetate grade) hemlock from Weyerhaeuser Company, Cosmopolis pulp plant.
B Bleached kraft hardwood (aspen) from Weyerhaeuser Company, Prince Albert pulp plant.
C Bleached kraft softwood (spruce-J. pine) from Weyerhaeuser, Prince Albert pulp plant.
D Regular bleached kraft Douglas fir (100 percent) from Weyerhaeuser Company, Everett pulp plant.
E Bleached sulfite-eucalyptus from Courtaulds Corporation of Coventry, England.
*3.5 hour treatment, sonolator pitted due to cavitation.

This table demonstrates the applicability of the dissolved cellulose feed stock preparation process to the dissolution of wide varieties of cellulose starting materials, including non-dissolving grades of wood pulp. Cellulose having the crystal form of Cellulose II, III or IV (regenerated cellulose) can also be dissolved into solution with this process. However, cavitation is typically less important and is optional when dealing with rayon or other forms of cellulose other than Cellulose I. The resulting dissolved cellulose may then be used in the production of sausage skins.

EXAMPLE III

In this example, performed utilizing the single stage process as illustrated in FIG. 2, the pulp of Example II was slurried at a concentration of 2 percent by weight. This pulp also had an initial degree of polymerization of about 840. In this case, 20 gram samples of cellulose were subjected to cavitation for 180 minutes using the same sonolator as in Example II, operated at 20 kHz. These samples were placed in caustic NaOH at concentrations varying from 6 percent, 9 percent, and 12 percent by weight/weight of slurry and at temperatures varying from −6° C., 2° C., and 10° C. Each emulation of these temperatures and concentrations were tested to obtain results at conditions within and outside of soda cellulose Q conditions. The range of the percent of dissolved cellulose was between 6.5 percent and 100.0 percent depending upon the conditions. The resulting degree of polymerization of the dissolved cellulose ranged from 195 to 330. The best results occurred at 9 percent NaOH concentration and a temperature of 2° C. which yielded 95 percent dissolution and a degree of polymerization of 280; and at 9 percent NaOH concentration and a temperature of −4° C. which yielded 100 percent dissolution and a degree of polymerization of 195. Both of these results were at the boundary of soda cellulose Q conditions. A lower quantity of dissolved cellulose was generally achieved as the slurry was treated further from soda cellulose Q conditions. These results are set forth in Table II. Again, the resulting dissolved cellulose may be used in producing sausage skins.

TABLE II

| Run | Caustic Conc. (Wt. %) | Temperature (°C.) | Percent Dissolved | Solution DP |
|---|---|---|---|---|
| 1 | 9 | 2 | 95.0 | 280 |
| 2 | 12 | 2 | 6.5 | 220 |
| 3 | 6 | 2 | 32.2 | 230 |
| 4 | 6 | 10 | 16.8 | 240 |
| 5 | 9 | −4 | 100.0 | 195 |
| 6 | 9 | 10 | 67.8 | 200 |
| 7 | 6 | −4 | 62.5 | 290 |
| 8 | 12 | −4 | 34.2 | 330 |
| 9 | 12 | 10 | 67.1 | 230 |

EXAMPLE IV

This example relates to the two stage process as illustrated in FIG. 3. The same pulp as used in Example II was mixed into a cellulose slurry with a concentration of 2 percent by weight. This cellulose had an initial degree of polymerization of 840 and was subjected to cavitation for 12 minutes/gram using the same sonolator as in Example II, operated at 20 kHz. The cavitated slurry was subsequently taken to soda cellulose Q conditions with an NaOH concentration of 7.5 percent by weight and at a temperature of about 0° C., and mixed using a high shear Henschel mixer, operated at 640 rpm. This example resulted in from about 86 to about 100 percent dissolution of the cellulose with a degree of polymerization of the cellulose in solution of about 640. This example demonstrated that a very high degree of polymerization and a high percentage of dissolution can be achieved with a two stage process. Again, the dissolved cellulose may be used as a feed stock in the production of sausage skins.

While the present invention has been described in accordance with preferred embodiments, it is to be understood that certain substitutions, variations and changes may be made thereto without departing from the invention as set forth in the claims. I claim all such changes as fall within the scope of the following claims:

I claim:

1. A method of processing cellulose sausage skins comprising:

a. filling cellulose sausage skins with contents to make sausages;

b. removing the cellulose sausage skins from the sausages;

c. dissolving the removed sausage skins to form a recycled cellulose dope; and d. forming sausage skins from the recycled cellulose dope.

2. A method according to claim 1 in which the dissolving step is accomplished by placing the removed sausage skins in a slurry at or near soda cellulose Q condition.

3. A method according to claim 1 in which the dissolving step comprises the step of placing the removed sausage skins in a slurry with an NaOH concentration of 6 percent to 10 percent by weight and at a temperature between −7° C. and 4° C.

4. A method according to claim 1 including the step of filling sausage skins formed in step d with contents to make sausages.

5. A method according to claim 1 including repeating steps a–d and utilizing sausage skins formed in step d in step a as step a is repeated.

6. A method according to claim 1 including the step of adding additional cellulose to the removed skins and in which the dissolving step comprises dissolving the additional cellulose and removed skins to form the recycled cellulose dope.

7. A method according to claim 6 in which the dissolving step includes the step of subjecting the added additional cellulose and removed skins in a slurry to cavitation and a solvent.

8. A method according to claim 7 in which the solvent is NaOH at from 6 to 10 percent by weight and the cellulose slurry is at a temperature of from −7° C. to 4° C. to dissolve the added additional cellulose and removed skins.

9. A method according to claim 1 which includes the step of adding additional dissolved cellulose to the recycled cellulose dope formed in step c.

10. A method according to claim 1 which includes the step of adding additional dissolved cellulose to the removed skins to step b.

11. A method according to claim 10 in which the additional dissolved cellulose is formed by subjecting a cellulose slurry to cavitation and a solvent.

12. A method according to claim 11 in which the solvent is NaOH at from 6 to 10 percent by weight and the cellulose slurry is at a temperature of from −7° C. to 4° C. to form the additional dissolved cellulose.

13. A method according to claim 1 including the step of forming sausage skins utilized in step a by subjecting a cellulose slurry to cavitation and a solvent to dissolve the cellulose in the slurry and form a cellulose dope, and forming said sausage skins from the cellulose dope resulting from subjecting a cellulose slurry to cavitation and a solvent.

14. A method according to claim 13 in which the cellulose slurry is subjected to cavitation and to solvent at or near soda cellulose Q condition.

15. A method according to claim 14 in which the cellulose slurry is subjected to cavitation and a solvent of from 6 to 10 percent NaOH and wherein the slurry and solvent is at a temperature of from −7° C. to 4° C. to dissolve the cellulose in the slurry and form the cellulose dope.

16. A method of processing cellulose sausage skins comprising:

placing the sausage skins in a slurry of from 6 percent to 10 percent by weight NaOH; and maintaining the temperature of the slurry from −7° C. to 4° C. to dissolve the sausage skins.

17. A method of processing cellulose sausage skins comprising:

a. subjecting a cellulose slurry to cavitation and a solvent to dissolve the cellulose in the slurry and form a cellulose dope; and b. forming sausage skins from the cellulose dope.

18. A method according to claim 17 in which the cellulose slurry is subjected to cavitation and to solvent at or near soda cellulose Q condition.

19. A method according to claim 17 in which the cellulose slurry is subjected to cavitation and a solvent of from 6 to 10 percent NaOH with the slurry and solvent at from −7° C. to 4° C. to dissolve the cellulose in the slurry and form the cellulose dope.

20. A method of processing cellulose sausage skins according to claim 17 comprising the additional steps of:

c. filling the sausage skins with contents to make sausages;

d. removing the cellulose sausage skins from the sausages;

e. dissolving the removed sausage skins to form a recycled cellulose dope; and f. forming sausage skins from the recycled cellulose dope.

21. A method according to claim 20 in which the dissolving step e is accomplished by placing the removed sausage skins in a slurry at or near soda cellulose Q condition.

22. A method according to claim 20 in which the dissolving step e comprises the step of placing the removed sausage skins in a slurry with an NaOH concentration of 6 percent to 10 percent by weight and at a temperature between −7° C. and 4° C.

23. A method according to claim 20 including the step of repeating the step c using sausage skins formed in step f.

24. A method according to claim 20 including repeating steps c–f and utilizing sausage skins formed in step f in step c as step c is repeated.

25. A method according to claim 20 including the step of adding additional cellulose to the removed skins and in which the dissolving step e comprises dissolving the added additional cellulose and the removed skins to form the recycled cellulose dope.

26. A method according to claim 25 in which the dissolving step e includes the step of subjecting the added additional cellulose and removed skins in a slurry to cavitation and a solvent.

27. A method according to claim 26 in which the solvent is NaOH at from 6 to 10 percent by weight and the cellulose slurry is at a temperature of from −7° C. to 4° C. to dissolve the added additional cellulose and removed skins.

28. A method according to claim 20 which includes the step of adding additional dissolved cellulose to the removed skins of step d or to the recycled cellulose dope of step e.

29. A method according to claim 28 in which the additional dissolved cellulose is formed by subjecting a cellulose slurry to cavitation and a solvent.

30. A method according to claim 29 in which the solvent is NaOH at from 6 to 10 percent by weight and the cellulose slurry is at a temperature of from −7° C. to 4° C. to form the additional dissolved cellulose.

* * * * *